Oct. 22, 1940.  W. C. WAGNER  2,218,668
ELECTRIC METER
Filed June 3, 1937  4 Sheets-Sheet 1

WITNESS:

INVENTOR
Walter C. Wagner
BY
Augustus B S Houghton
ATTORNEY.

Oct. 22, 1940.   W. C. WAGNER   2,218,668
ELECTRIC METER
Filed June 3, 1937   4 Sheets-Sheet 2

INVENTOR
Walter C. Wagner
BY
Augustus B. Stoughton
ATTORNEY.

WITNESS:
Robt R. Kitchel

Oct. 22, 1940.   W. C. WAGNER   2,218,668
ELECTRIC METER
Filed June 3, 1937   4 Sheets-Sheet 3

WITNESS:

INVENTOR
Walter C. Wagner
BY
Augustus B Stoughton
ATTORNEY.

Oct. 22, 1940.  W. C. WAGNER  2,218,668

ELECTRIC METER

Filed June 3, 1937    4 Sheets-Sheet 4

WITNESS:
Rob² C. Kitchel

INVENTOR.
Walter C. Wagner
BY
Augustus B. Stoughton
ATTORNEY.

Patented Oct. 22, 1940

2,218,668

UNITED STATES PATENT OFFICE 2,218,668

ELECTRIC METER

Walter C. Wagner, Ardmore, Pa.

Application June 3, 1937, Serial No. 146,209

10 Claims. (Cl. 171—264)

This invention relates to electric meters and more particularly relates to integrating meters for measuring energy transmitted by the high-tension circuit of a power transformer or transformers with the meter connected in the low-tension circuit leading therefrom.

Measurement of electric energy in the low-tension circuits of power transformers to include the energy dissipated in the transformer and/or in the associated electric conductors and equipment has the advantage over high-tension metering equipment in that capital and operating costs are greatly reduced, space is conserved, personal hazards incident to line and metering operation and maintenance are reduced, and vulnerability of the metering equipment to damage by high-tension and lightning surges, and consequent service interruptions, are minimized.

Energy dissipated in power transformers can be considered as composed of core losses and copper losses. The core losses, for given frequency and wave form, vary approximately as the square of the voltage. The copper losses in the transformer and associated electric conductors and equipment are directly proportional to the square of the load current.

By means of the customary adjusting device, the registration of a standard watthour meter connected in the secondary circuit of a transformer can be changed from that of the output of the transformer by an amount corresponding to the sum of the copper losses concerned at any load and the core loss of the transformer over part of the meter load range. A watthour meter whose registration is so modified can therefore be used in the secondary circuit to measure energy transmitted by the primary circuit of the transformer, provided extreme accuracy at all points of the meter load range is not required. The particular defect of this method of metering is that the errors of registration increase with decreasing load and are extremely high at zero transformer load. In certain cases, transformers may be operated for long periods at very light or no load and such errors become important in the total meter registration.

The principal object of my invention is to produce a meter in which these defects are overcome.

Another object of my invention is to provide an improved meter which, when connected in the secondary circuit of a transformer, will measure with accuracy the energy transmitted by the primary circuit of said transformer.

With these and related objects in view which will become apparent as the description proceeds, my invention embodies a watthour meter connected in the secondary circuit of a transformer and adapted to measure the energy in the primary circuit of said transformer, said meter including a voltage-squared-hour element or the equivalent to increase the registration by an amount proportional to that part of the core loss of said transformer which cannot be compensated for by the use of the customary adjusting devices of a standard watthour meter.

My invention, both as to details of construction and combination of parts, will be better understood from the following description of specific embodiments, when read in connection with the accompanying drawings, in which.

Similar numbers refer to similar parts throughout the several views.

Figure 1:
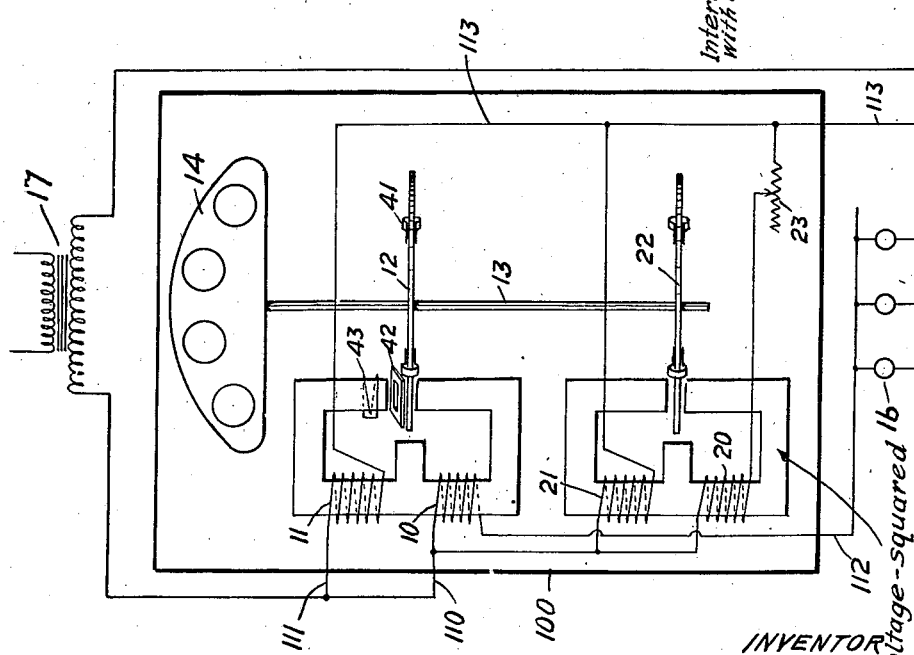
Fig. 1 is a diagrammatical view of one form of my invention, and the circuit connections thereto.

In Fig. 1 the top element is a standard watthour meter element which includes a current electromagnet 10 in series with the load current, a potential electromagnet 11 connected across the line, and a disk 12 which is mounted on a shaft 13 suitably geared to a register 14 in the customary manner. This element includes the usual full-load adjusting devices 41, light-load adjusting devices 42, and dephasing coils 43. The meter is connected between a transformer 17 and load 16 and is contained in the housing or casing 100. Lead 111 connects with potential coil 11 while lead 110 connects with current coil 10. Lead 112 connects current coil 10 with load 16 while lead 113 connects potential coils 11 and 21 and electromagnet 20 having the characteristics of a current electromagnet with transformer 17.

The lower element of Fig. 1 comprises an electromagnet 20 having the characteristics of a current electromagnet, and an electromagnet 21 having the characteristics of a potential electromagnet, both operating on a disk 22 also connected to shaft 13. The potential electromagnet 21 is a standard watthour meter potential electromagnet and is connected across the line. The current electromagnet 20 in series with an adjustable resistor 23 is connected across the line. This element, therefore, has the torque characteristics of a voltage-squared-hour-meter element.

The calibration of my meter for use with any designated transformer is performed as follows:

With no current flowing through electromagnet 10 and with electromagnet 11 connected across the line, resistor 23 is adjusted to produce registration of the predetermined core loss. The meter is then calibrated at various loads in the customary manner except that adjustments are made so that the meter registration at the selected loads is increased by calculated values corresponding to the core and copper losses of the transformer for transformer secondary loadings equal to the selected loads.

Figure 2:
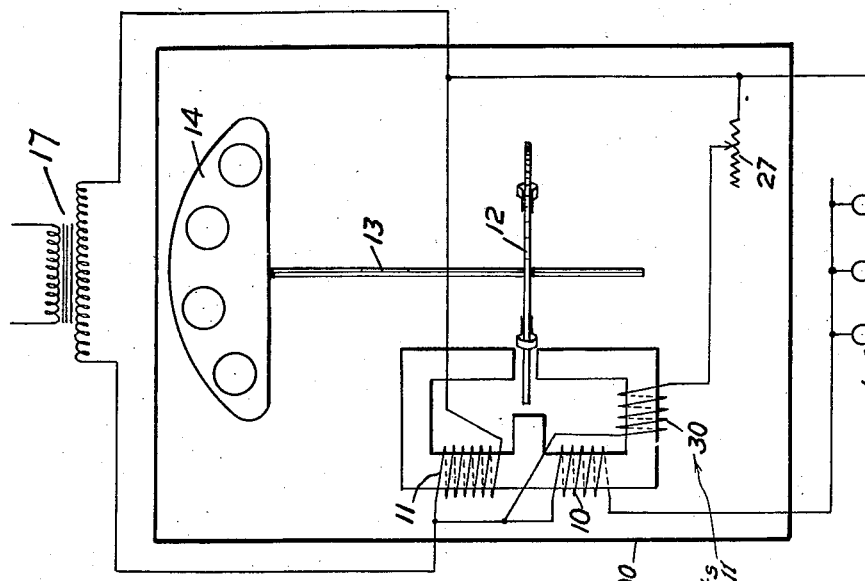
Fig. 2 is a diagrammatical view showing a modification of my invention.

Fig. 2 shows a modification which is a functional equivalent of the device of Fig. 1. In this device the voltage-squared-hour component of the torque imparted to the shaft 13 is produced in the single disk 12 by interaction of the electromagnetic effects of an auxiliary winding 30 and the ordinary potential electromagnet 11 of a watthour meter. Winding 30, which has the characteristics of a current electromagnet, is superposed upon the poles of winding 10, or wound at any convenient location upon the magnetic structure of which these poles form a part, and is connected in series with adjustable resistor 23 across the line. The remaining parts of this modification are an ordinary watthour meter element as illustrated in Fig. 1.

Figure 3:
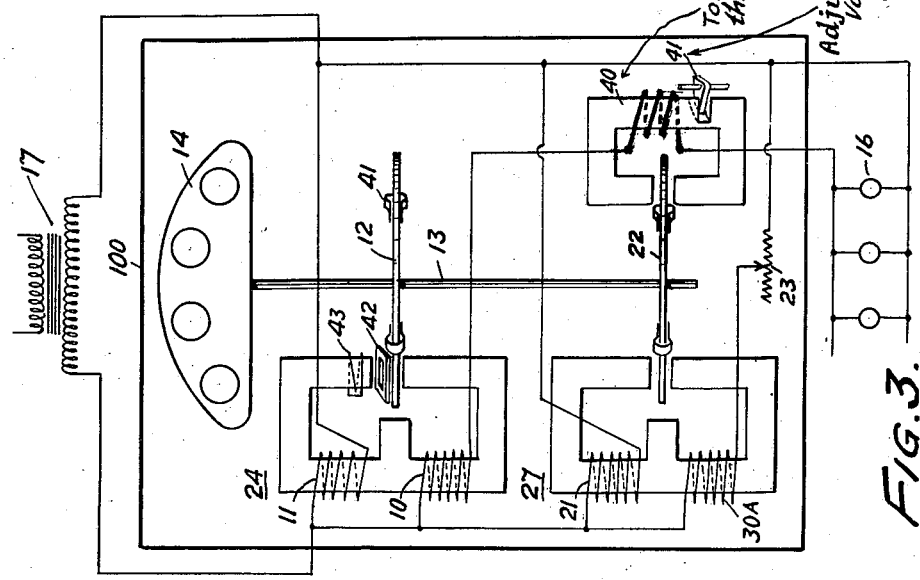

Fig. 3 illustrates another modification of my invention. The top element 24 is a standard watthour meter element which includes a current electromagnet 10, a potential electromagnet 11, a disk 12 attached to a shaft 13 which is suitably geared to the register 14 to register the electric energy supplied to load 16 from the secondary of transformer 17, and the customary watthour meter adjusting devices 41, 42 and 43.

The bottom element 27 of Fig. 3 includes an electromagnet 21, having the characteristics of a potential electromagnet, and an electromagnet 30A, having the characteristics of a current electromagnet, both operating on a disk 22 also attached to shaft 13. The potential electromagnet 21 and the current electromagnet 30A in series with an adjustable resistor 23 are connected across the line. Electromagnets 21 and 30A, comprising a voltage-squared-hour element, cooperatively produce in disk 22 a torque which may be adjusted by means of resistor 23 to cause registration of the desired transformer core loss. Although the usual friction-compensating or light-load adjusting device of a standard watthour meter may be adjusted to produce a torque of the nature of a voltage-squared torque, the range of adjustment is generally inadequate to cause increase of registration equivalent to the core loss of power transformers. On the other hand, the winding 30A provides a true voltage-squared torque with as great a range of adjustment as desired.

A current electromagnet 40, which may consist of relatively few turns of heavy wire, is connected in series with the load 16 and is so wound that its magnetic influence opposes the torque created in disk 22 by the coaction of electromagnets 21 and 30A. At some definite load, the countertorque produced by winding 40, which is proportional to the load, exactly cancels the core-loss torque produced by electromagnets 21 and 30A, and element 27 then does not add to the registration of element 24. The magnetic circuits of the current electromagnets are designed to obtain magnetic saturation substantially when the resultant torque of element 27 is zero by means of an adjustable part 41 to alter the cross-sectional area of a part of the core or by other means. Further increase in current through winding 40 may produce additional negative torque and damping. These are relatively small and proportional to the load and may therefore be compensated for by the customary full-load adjusting device of the watthour element 24.

The calibration of the meter illustrated in Fig. 3 for use in the secondary circuit of any designated transformer to measure primary energy is performed as follows:

With no current flowing through windings 30A and 40 of element 27, and with potential electromagnets 11 and 21 energized, the standard watthour element 24 is adjusted, by the customary means, to register the transformer primary energy corresponding to the usual meter calibration points. Then, with no current flowing through series windings 10 and 40, and with potential electromagnets 11 and 21 energized, the current electromagnet 30A of element 27 is adjusted, by means of resistor 23, to produce meter registration corresponding to the predetermined core loss. Sufficient current is then passed through electromagnet 40 to produce a countertorque to cause shaft 13 to cease rotating. The characteristics of coil 40 are such that the magnitude of current required to produce this effect is of the order of a few per cent of nominal current rating of element 24. The core of electromagnet 40 is adjusted to secure magnetic saturation at the value of current determined as aforesaid. Magnetic saturation of the core of element 27 may be suitably controlled so as to occur at any required load by changing the number of laminations comprising the core, by introducing an adjustable part to alter the cross-sectional area of part of the core, or by other means.

Because of the relatively low torque values encountered in the measurement of core losses and loads of the same order, it is advisable in some cases to employ disks without the usual anticreep holes in my improved meter.

Although illustrated and described hereinbefore as being connected directly into and to electric conductors leading from the transformer secondary, my improved meter may be used also in conjunction with instrument transformers whenever the characteristics of the power circuits to be metered make such procedure advisable.

Figure 4:
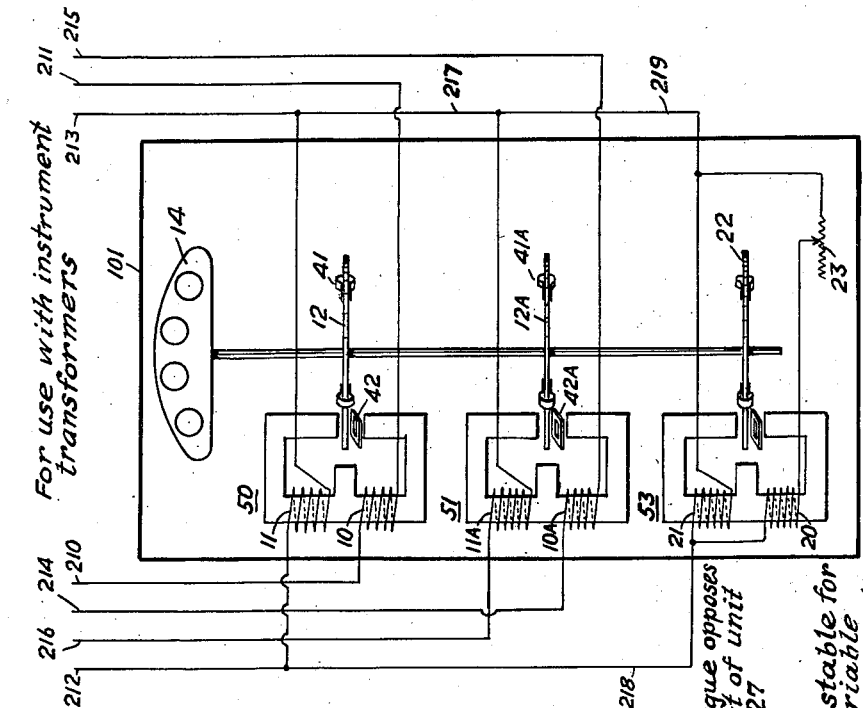
Figs. 3 and 4 are diagrammatical views showing further modifications of my invention.
Figure 5:
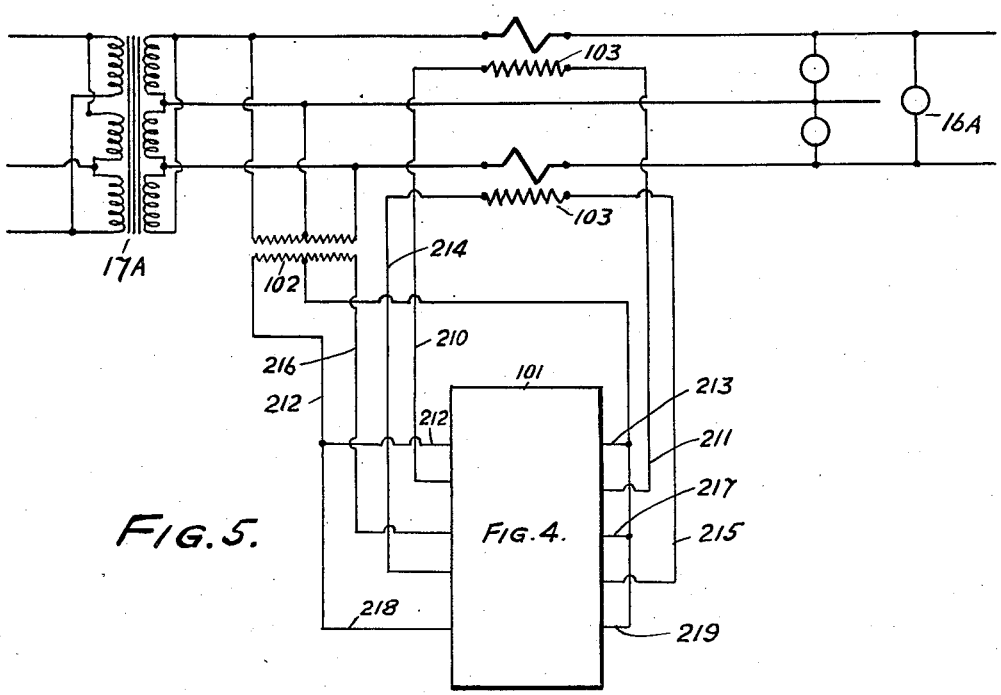
Figs. 5, 6 and 9 are diagrammatical views showing further modifications of my invention employing the modification shown in Fig. 4.

One way of doing this is shown in Figs. 4 and 5 in which my device is shown as consisting of two standard watthour meter elements 50 and 51. Element 50 shows a current coil 10 connected into the circuit by leads 210 and 211, and a potential coil 11 connected across the circuit by leads 212 and 213, respectively. Element 51 consists of a current coil 10A connected into the circuit by leads 214 and 215, and a potential coil connected across the circuit by leads 216 and 217, respectively. Elements 50 and 51 co-operate with disks 12 and 12A, respectively. Disks 12 and 12A are both mounted on shaft 13 which drives register 14. Elements 50 and 51 contain the customary watthour meter-adjusting devices 41, 42, 41A and 42A, respectively. This meter also includes a third element 53 similar to the lower element of Fig. 1 and having a potential coil 21 connected across the circuit by leads 218 and 219, and an electromagnet 20 having the characteristics of a current electromagnet, both operating on a disk 22 also connected to shaft 13. The current electromagnet 20 is in series with an adjustable resistor 23 across the line, being connected to leads 218 and 219. The entire meter is located in a housing or casing 101.

As is seen in Fig. 5, the meter shown in Fig. 4 is connected across a three-phase, three-wire circuit having a polyphase transformer 17A and potential transformers 102 and current transformers 103 and load 16A. The leads bear the same reference characters as in Fig. 4.

My invention is not limited to the single-phase form hereinbefore represented except in Figs. 4 and 5, but may, by the addition of a suitable number of elements, be adapted to meter polyphase circuits.

Figure 6:
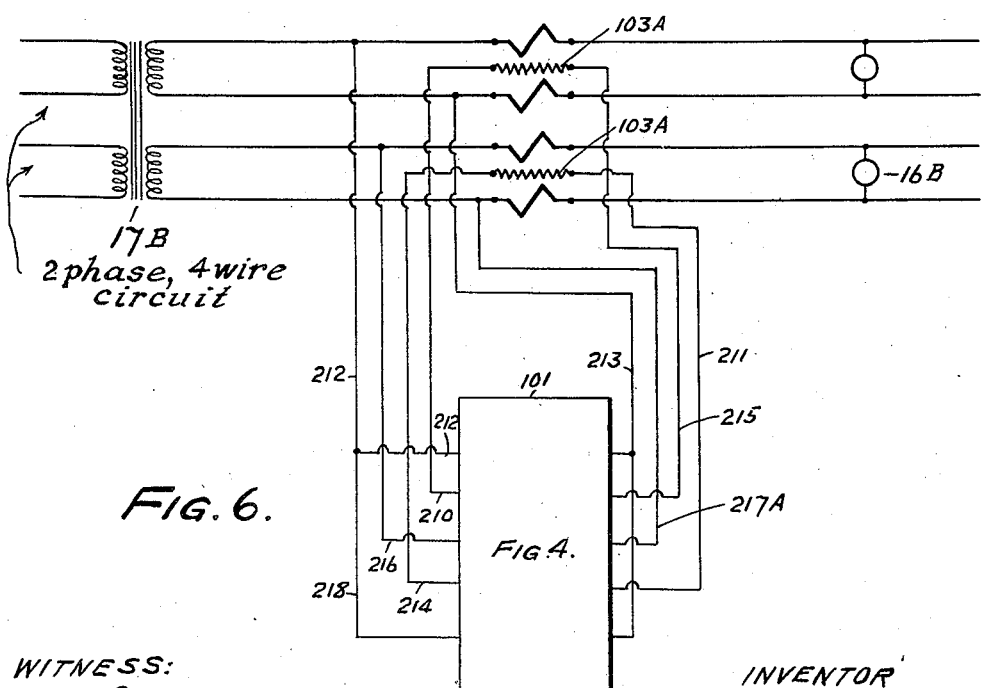

One example of this is shown in Fig. 6 in which the meter shown in Fig. 4 is connected into a two-phase, four-wire circuit having polyphase transformers 17B and current transformers 103A and load 16B. As will be seen from a comparison of Fig. 5, the meter is connected into the circuit by means of the leads as shown in Fig. 5 except that the lead 217 shown in Fig. 5, instead of being connected to the lead 213, is replaced by a lead 217A leading directly to one side of the main circuit on the input side of the current transformers 103A.

Figure 7:
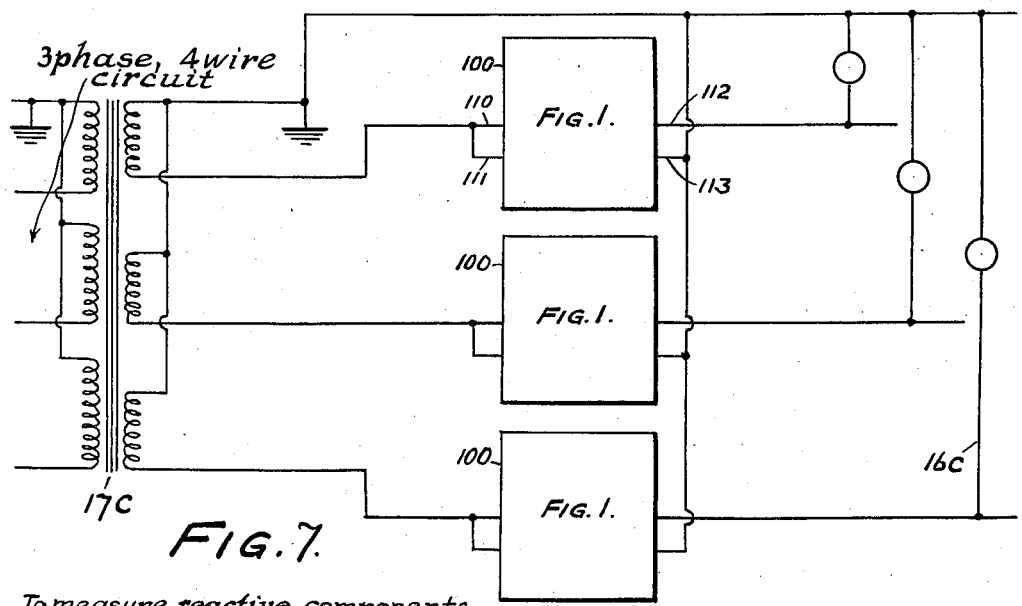
Figs. 7 and 8 are diagrammatical views showing further modifications of my invention employing the modification shown in Fig. 1.

Fig. 7 shows another way in which my invention is adapted to meter polyphase circuits. In this modification, three of the meters shown in Fig. 1 are connected into a three-phase, four-wire circuit having polyphase transformers 17C and load 16C but without current or potential transformers. The leads 110, 111, 112 and 113 connect to the meter elements through the casings 100 exactly as shown in Fig. 1.

Although in the foregoing description my invention is referred to as applied to the measurement of active energy only, it is equally applicable to the measurement of reactive components of load.

Figure 8:
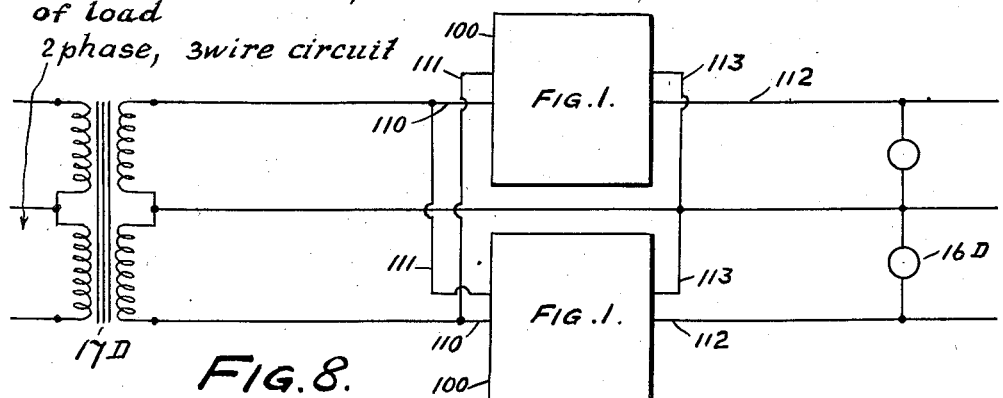

Just as electric power of a single phase load is the product of the circuit voltage, current and the cosine of the phase angle between them, the reactive component is the product of the voltage, current and sine of the phase angle. Hence, if the potential element of a standard watthour meter be supplied with a voltage in phase quadrature with the circuit voltage, the meter will measure the reactive component of the load. In single-phase circuits this quadrature potential is customarily obtained by a combination of resistance and reactance, in two-phase or quadrature circuits by cross-connecting the potential coils to opposite phase wires from those in which the corresponding current coils are connected, and in three-phase circuits by the use of special phasing transformers and/or reactors. Fig. 8 shows the connections for measuring the reactive components of load in a two-phase three-wire circuit, using two of the meters shown in Fig. 1. This circuit has a polyphase transformer 17D and a load 16D. Meters similar to those shown in Fig. 1 are connected into this circuit by leads 110, 111, 112 and 113 connected internally in the same way as those shown in Fig. 1. It will be noted that for each meter the potential coils are energized from one phase and the current coil from the other, thus accomplishing the cross-phase connection.

The procedure for calibrating my meter for the measurement of reactive components of load supplied through any designated transformer plus the reactive component of core loss of said transformer is the same as for the previously described calibration of my meter for active component measurements, except that the adjustments are made to produce meter registration proportional to the predetermined magnitude of the reactive components at the average voltage of the circuit to be measured.

Figure 9:
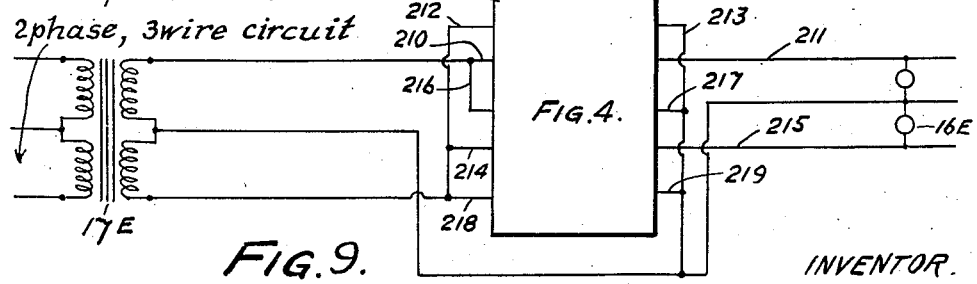

Another method of measuring reactive components of load is illustrated in Fig. 9 in which the meter shown in Fig. 4 is connected into a two-phase, three-wire circuit having polyphase transformer 17E and load 16E. The leads bear the same reference characters as those in Figs. 4 and 5 and connect inside the casing 101 to similar meter elements as in said Figs. 4 and 5. The connections shown in Fig. 9 are similar to those shown in Fig. 8, the essential difference between Figs. 8 and 9 being the replacement of the separate meters in Fig. 8 by their polyphase equivalent in Fig. 9. This means that whereas each lower element in the meters represented in Fig. 8 contributes torque proportional to the reactive component of the core loss of the transformer phase supplying the phase to which the particular element is connected, the lower element of Fig. 9 contributes a torque proportional to the reactive component of the total core loss of the transformer bank. Furthermore, the summation of phase measurements is automatically registered on a single set of dials in Fig. 9 obviating the necessity of adding the readings of separate meters as in Fig. 8.

My invention in any of the forms suitable for metering energy, specific embodiments of which are illustrated in Figs. 1 to 7, inclusive, is suitable for metering either reactive or unity power factor loads, calibration therefor being made as in customary metering practice.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. In a standard watthour meter connected between a transformer and a load and having adjustments for compensating for the core losses and for the copper losses of said transformer so as to measure the power fed to said transformer, an additional element for causing said meter to indicate in response to the square of the voltage applied to said element, and means for adjusting the voltage applied to said element to the amount representing the core losses in said transformer.

2. In a standard watthour meter connected between a transformer and a load and having adjustments for compensating for the core losses and for the copper losses of said transformer so as to measure the power fed to said transformer, a metal disk connected to the movable element of said meter, two coils mounted in operative relation to said disk and each connected across said transformer and across said load, and an adjustable resistance connected in series with one of said coils across said transformer and across said load.

3. In a standard watthour meter connected between a transformer and a load, the combination of, a metal disk, a current coil arranged to move said disk proportionately to the current passing through said meter to said load, a potential coil arranged to move said disk proportionately to the voltage applied to the meter and to said load, a coil in electromagnetic relation to said disk and to said current coil and arranged to move said disk proportionately to the square of the voltage applied to said coil, and means for adjusting the voltage applied to said last-mentioned coil to the amount representing the core losses in the transformer.

4. In a standard watthour meter connected in the secondary circuit of a power transformer and adjusted as nearly as possible for the measurement of the energy transmitted in the high-tension circuit of the transformer, a voltage-squared-hour element for increasing the driving torque of the meter by an amount proportional to that part of the core loss of said transformer which cannot be compensated for by the use of the standard adjusting devices of said meter.

5. For adjusting a standard watthour meter to increase its registration by an amount corresponding to transformer core losses which vary as the square of the voltage, means coacting with said standard watthour meter comprising an element having the characteristics of current and voltage elements and adapted to generate magnetic lines of force, and an element having the characteristics of a voltage element and adapted to generate other magnetic lines of force and operative upon said lines of force to increase the torque by the product of said magnetic lines of force, which gives rise to the voltage squared.

6. In a watthour meter having the customary current and potential electromagnets and a yoke and a disk with an air-gap between them, a coil in addition to said electro-magnets having the characteristics of a current electromagnet, a variable resistor, said coil in series with said variable resistor being connected in multiple with said potential electromagnet, and said coil being arranged on the yoke of said meter to produce asymmetry of magnetic flux distribution in the disk air gap.

7. In an electric watthour meter connected to the secondary of a transformer and arranged to register the power supplied to the primary of the transformer, a first standard watthour element, a second standard watthour element and having a friction compensating or light load adjusting device and having a current electromagnet, a single shaft arranged for rotation by said elements, the friction compensating or light load adjusting device of said second element being adjusted to counteract the core loss at no load and the current electromagnet of said second element being connected in series with the load so that its magnetic influence opposes the torque of said first element, and means to produce magnetic saturation of the core of said current electromagnet at loads greater than that at which the resultant torque of said second element is zero.

8. In a watthour meter, a register, a standard watthour meter element having a potential coil and a current coil, an auxiliary special watthour meter element having a potential coil and a current coil wound in magnetic relation and imparting a voltage squared component of torque by interaction of their electric magnetic effects, an auxiliary winding connected in series with the current coil of the standard element and imparting a retarding torque to said auxiliary element, and a single shaft arranged for rotation by said elements and connected to said register to drive it.

9. In a standard watthour meter connected between a transformer and a load, a register, a standard watthour meter element having a potential coil and a current coil and adjusted for registration of the primary energy at the selected meter loadings, an auxiliary special watthour meter element having a potential coil and a current coil wound in magnetic relation and imparting a voltage squared component of torque by interaction of their electric magnetic effects, an auxiliary winding connected in series with the current coil of the standard element and imparting a retarding torque to said auxiliary element, a single shaft arranged for rotation by said elements and connected to said register to drive it, and means to produce magnetic saturation of the core of said auxiliary electromagnet.

10. In combination with a standard watthour meter element having a magnetic flux circuit with an air-gap therein and a disk in said circuit and in said air-gap, a coil in addition to the electromagnets of said meter and having the characteristics of a current electromagnet and having impedance adjusting means, said coil being connected in multiple with the potential electromagnet of said meter, and being arranged in the magnetic flux circuit of said meter to produce asymmetry of flux distribution in the disk air-gap of said meter.

WALTER C. WAGNER.